United States Patent [19]

Bossler, Jr.

[11] 3,845,735

[45] Nov. 5, 1974

[54] APPARATUS FOR MEASURING WEAR OF ROD END BEARINGS

[75] Inventor: Robert B. Bossler, Jr., Bloomfield, Conn.

[73] Assignee: Kaman Aerospace Corporation, Bloomfield, Conn.

[22] Filed: June 22, 1973

[21] Appl. No.: 372,666

[52] U.S. Cl.................. 116/114 Q, 308/72, 403/27
[51] Int. Cl. ........................................... G01d 21/00
[58] Field of Search .......... 116/114 Q; 403/27, 131; 308/72

[56] References Cited
UNITED STATES PATENTS

| | | | |
|---|---|---|---|
| 2,384,095 | 9/1945 | Keahey | 403/131 |
| 3,371,398 | 3/1968 | Patterson et al. | 29/149.5 |
| 3,791,748 | 2/1974 | Goodrich, Jr. et al. | 403/27 |

Primary Examiner—Louis J. Capozi
Attorney, Agent, or Firm—Cushman, Darby & Cushman

[57] ABSTRACT

Apparatus for measuring wear on rod end bearings and method of manufacture whereby an indicator pin is mounted in a raceway within the bearing with one end adjacent the spherical ball and the other end extending through a bore in the rod end to protrude above the outer rod end surface. The wear can be determined by placing the rod end in compression to force the spherical ball into contact with the seat opposite the raceway and depressing the protruding pin end manually until a pin end intimately contacts the ball so that the length of the protruding pin end indicates wear. In one embodiment the rod end surface adjacent the protruding pin is formed as a raised reference surface with the pin extending through a recessed portion thereof.

5 Claims, 6 Drawing Figures

APPARATUS FOR MEASURING WEAR OF ROD END BEARINGS

BRIEF DESCRIPTION OF THE PRIOR ART AND SUMMARY OF THE INVENTION

The invention relates to an apparatus for providing an indication of wear of rod end bearings, such as typically employed in helicopter control systems and to a method of making such apparatus.

The measurement of rod end bearing wear has been cited as a problem by most users of U.S. Army and other helicopters. The problem is to detect when allowable wear has been exceeded so that the bearings can be replaced. Typically, for use by the U.S. Army, allowable wear is of the order of 0.020 inches to 0.030 inches.

The usual method of measurement of wear now is by "feel" or "shake" while the rod end is actually installed in the helicopter. This technique is exceedingly inaccurate and can permit dangerous situations to occur. A second technique now in use is to remove the rod end from the helicopter and measure wear by a dial indicator. This technique is not only difficult and time consuming, but because it requires the removal of the rod end cannot be practically carried out on a frequent basis.

The present invention relates to a simple apparatus for providing an indication of wear and to a method of making such structure. The apparatus includes a measuring pin which is placed in the bearing outer race before the bearing is assembled so that after assembly the pin is permanently trapped in the race. One end of the pin extends through a bore which connects the raceway and bearing outer surface. The other end of the pin is provided with a shoulder or tapered surface which restricts movement of the portion of the pin adjacent the spherical ball. The inward movement of the pin is restricted by the spherical ball while the outward movement is restricted by the pin shoulder, and the pin is free to move between these limits. This free motion is typically greater than the allowable wear.

When one end of the pin is in contact with the spherical ball and the ball surface is in contact with the inner bearing surface opposite the raceway, the other end protrudes above the adjacent outer surface of the rod end bearing. Preferably, the axis of the bore, and accordingly the axis of the end of the pin extending in the bore, coincides with the axis of the rod end bearing, which is normally the axis of applied load and greatest wear. At the time of bearing assembly, the ball is loaded into intimate contact with its spherical seat on the side opposite the pin. The pin is then depressed manually or otherwise to contact the spherical ball. The protruding portion of the pin is then machined to a height above the adjacent surface which is equal or slightly less than the allowable wear. The rod end bearing wear can then be checked at any time simply by loading the control linkage on the helicopter or other structure in compression so that the ball is forced into intimate contact with the spherical seat on the side opposite the pin. The pin then can be depressed by the mechanic with his thumb nail or a steel scale, screwdriver blade or the like. The allowable wear has been exceeded if the pin sinks below the adjacent level of the rod end.

According to the further embodiment of the invention, the rod end is provided with a raised ridge-like boss which functions as a reference surface. The boss has a recessed portion provided by a machined transverse slot with the bore for the end extending from the spherical ball to the recessed portion. The depth of the recess preferably is made equal to the desired allowable wear. The end of the pin extending out of the rod through the recess can then be simply machined off to coincide with the reference level with the pin in contact with the ball and the rod bearing loaded in compression.

This simple apparatus represents a very inexpensive and accurate technique and apparatus for indicating bearing wear particularly on a helicopter. Since the measuring device is physically mounted in the rod bearing, it is always ready for use and no disassembly of the unit is required for accurate measurement. Further, the measurement can be made by a person of minimal skill after simple instruction. No change in the design of the rod end bearing is necessitated and the measuring device adds negligible weight and cost to conventional rod end bearings. The ability of the measuring pin to function can be easily determined by reversing the load in the helicopter linkage while depressing the pin and observing if the height of the pin changed.

Further, with respect to the additional embodiment of the invention in which the rod end is provided with a raised reference surface, that surface provides some protection against damage to the pin protruding into the recessed portion or slot. Since the pin is normally machined to the reference level, no measurement of height above the rod end is necessary and accuracy is even further enhanced. Further, with the additional embodiment, wear can be measured on rod ends which are actually loaded in compression or in tension or both. If the pin and the reference surface are both accessible, wear can be, if desired, measured by a dial indicator which measures the difference between the reference surface and the protruding end of the pin while the rod end remains installed. Further, the same rod end can be measured for wear in different applications having different wear allowances.

Many other objects and purposes of the invention will become clear from the following detailed description of the drawings.

DETAILED DESCRIPTION OF THE DRAWINGS

Figure 1:
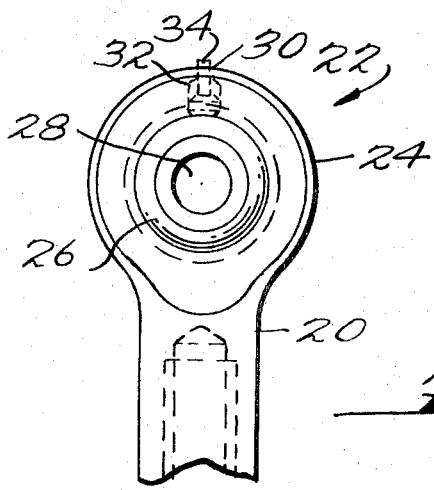
FIG. 1 illustrates an end view of a rod end bearing illustrating the apparatus of this invention in place for measuring wear.
Figure 3:
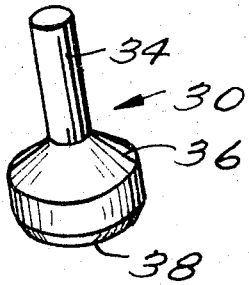
FIG. 3 illustrates a perspective view of the pin which is employed to indicate wear.

Reference is now made to FIG. 1 which illustrates one embodiment of the invention of this application. As can be seen in FIG. 1, a rod 20, such as is conventionally employed in helicopters and other applications, terminates in an end bearing 22 which includes rod end 24 and a spherical ball 26 mounted therein for rotation about axis 28. Indicating pin 30 is trapped within an outer bearing race 32 and is placed in race 32 manually or otherwise at the time of assembly of rod end bearing 22. As can be seen better in FIG. 3, pin 30 includes an end 34 which extends through a bore between outer race 32 and the exterior surface of rod end 24. The movement of pin 30 is restricted by shoulder 36 and end 38 of pin 30 which contacts spherical ball 26 when pin 30 is moved inward. Thus, pin 30 is free to move between the position where shoulder 36 contacts the outer surface of race 32 and the position where end 38 contacts spherical ball 26.

At the time of assembly of rod bearing 22, pin 30 is placed as illustrated in FIG. 1 so that it is permanently trapped in bearing outer race 32. The end 34 of pin 30 extending beyond rod end 24 is then machined while ball 26 is loaded into intimate contact with spherical seat 38 so that the protruding portion of the pin is equal to or slightly less than the allowable wear. For measuring rod end wearing, the mechanic need only load the control linkage in compression to force the spherical seat opposite pin 30 into intimate contact with ball 26 with ball 26 contacting the inner surface of rod end 24 opposite pin 30. Pin 30 can then be depressed with a thumb nail, a steel scale or the like. If the allowable wear has been exceeded, pin 30 sinks below the adjacent surface of rod end 24, which can be easily noted.

Figure 2:
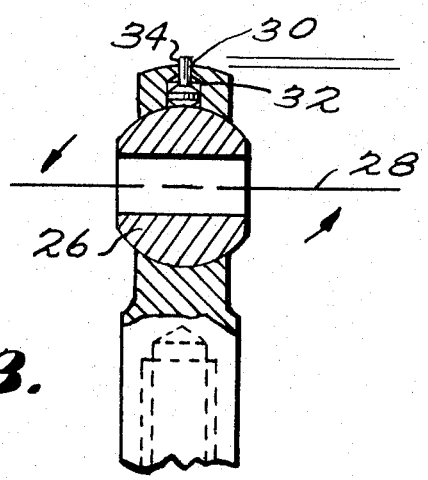
FIG. 2 illustrates a side cut-away view of the rod end bearing of FIG. 1.
Figure 4:
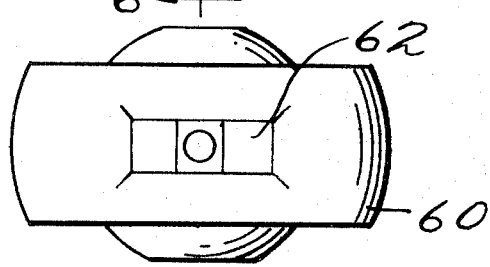
FIG. 4 illustrates a top view of a further rod end bearing embodiment.
Figure 5:
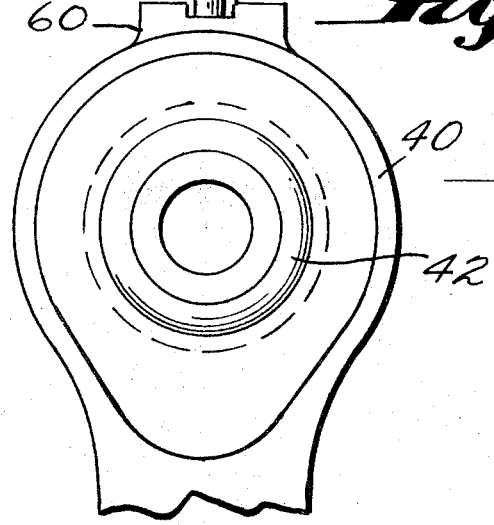
FIG. 5 illustrates a side view of the rod end bearing of FIG. 4.
Figure 6:
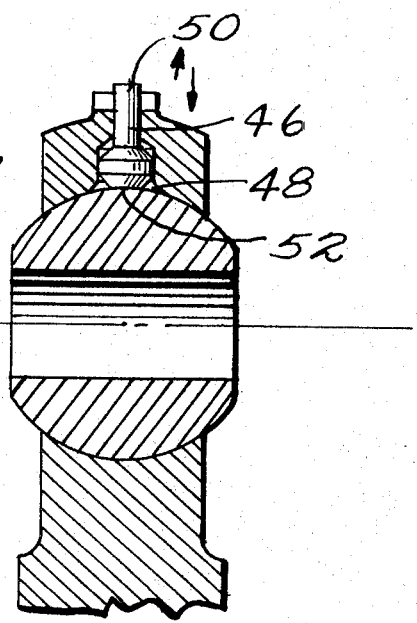
FIG. 6 illustrates a cut-away side view of the unique rod end bearing embodiment of FIGS. 4 and 5.

Reference is now made to FIGS. 4–6 which illustrate a further embodiment of the invention. As in the embodiment of FIGS. 1–3, the rod end 40 is provided with a spherical ball 42 which is free to rotate about axis 44 with a pin 46 mounted in and permanently trapped in outer raceway 48. Pin 46 is identical to pin 30 illustrated in FIG. 3 and is provided with an end 50 which extends through a bore in the rod end 40 between race 48 and the outer surface of rod end 40, and an end 52 which contacts ball 42 when pin 46 is depressed.

However, in the embodiments of FIGS. 4–6, rod end 40 is manufactured with a raised ridged boss 60 on the top thereof with a recessed portion 62 provided by a machined transverse slot. The bore for pin 46 terminates in recessed portion 62. Preferably, the depth of the recess is equal to the planned allowable wear but may be greater than the anticipated allowable wear to permit the same construction to be used to detect different allowable wears for different applications. The ridge like boss 60 may be oriented as shown or at any other angle. The boss may consist of two wings as shown or a single wing or pedestal. The diameter of the pins, dimensions of the reference surface and the machined recess are suitable for wear indication with a ball-ended dial indicator as well as with a simple indication by noting whether the end 50 of pin 46 extends above the flat reference surface defined by boss 60.

As in the above embodiment, at the time of manufacture the top surface of the pin in FIGS. 4–6 is machined to a level to indicate wear. In the embodiments of FIGS. 4–6, the top surface of pin 46 is preferably machined to coincide with the reference surface with pin 46 in contact with spherical ball 42. Wear can be measured by displacement of the pin with respect to the reference surface either visually or by a gauge. Total wear can be measured by finding the total of pin displacement above and below the reference surface in response to a reverse load.

Many changes and modifications in the above described embodiments of the invention can, of course, be made without departing from the scope of the invention. It may be desirable to provide the pin and/or the bore through the rod end with a chamfer to provide space for debris to accumulate if it is found that the pin can give a false reading by resting on an accumulation of material trapped in the bore. The protruding pin must be high enough and tough enough to not be easily worn off or broken. The rod end may require a thicker section around the pin hole if the pin hole is found to increase stress beyond acceptable limits. The pin may require a seal to keep corrosive materials such as dirt from reaching the bearing surface. The indicator may be spring loaded if desirable or the amount of wear can be determined by manually depressing the indicator.

What is claimed is:

1. In combination:
a bearing member having an inner bearing surface bounding a journal means receiving space and an outer surface, a raceway adjacent and opening onto said inner surface and a bore extending between said raceway and said outer surface;
journal means mounted within said journal receiving space of said bearing and bounded by said inner bearing surface; and
an indicator pin having a portion extending in said raceway from one end of said portion which contacts said journal means to a shoulder for holding said pin in said raceway and preventing said portion moving into said bore and an indicator end extending from said shoulder through said bore to a position with respect to said outer surface of said bearing member indicating wear when said seat is in contact with said journal means.

2. In combination as in claim 1 wherein said bearing member includes a reference surface extending adjacent to the opening of said bore onto said outer surface with a recessed portion through which said pin end extends.

3. In combination as in claim 2 wherein said reference surface comprises a relatively flat surface raised above the rest of the bearing member outer surface and said recessed portion comprises a machined transverse slot.

4. In combination as in claim 1 wherein said bearing member is a rod end and said bore has an axis coinciding with the axis of the rod and wherein said journal means is a spherical ball.

5. In combination as in claim 1 wherein said pin end protrudes above said outer surface until allowable wear has been exceeded.

* * * * *